(12) United States Patent
Adedeji et al.

(10) Patent No.: US 6,872,777 B2
(45) Date of Patent: Mar. 29, 2005

(54) POLY(ARYLENE ETHER)-POLYOLEFIN COMPOSITION, METHOD FOR THE PREPARATION THEREOF, AND ARTICLES DERIVED THEREFROM

(75) Inventors: Adeyinka Adedeji, Albany, NY (US); Thomas J. Hartle, Delmar, NY (US); John C. Haylock, Schenectady, NY (US)

(73) Assignee: General Electric, Pittsfield, MA (US)

( * ) Notice: Subject to any disclaimer, the term of this patent is extended or adjusted under 35 U.S.C. 154(b) by 379 days.

(21) Appl. No.: 10/063,336

(22) Filed: Apr. 12, 2002

(65) Prior Publication Data

US 2003/0036602 A1 Feb. 20, 2003

Related U.S. Application Data

(60) Provisional application No. 60/300,794, filed on Jun. 25, 2001.

(51) Int. Cl.$^7$ .............................................. C08L 53/00
(52) U.S. Cl. .............................. 525/88; 525/71; 525/70; 525/63
(58) Field of Search .............................. 525/88, 71, 70, 525/63

(56) References Cited

U.S. PATENT DOCUMENTS

| | | |
|---|---|---|
| 4,239,673 A | 12/1980 | Lee, Jr. |
| 4,242,263 A | 12/1980 | Lee, Jr. |
| 4,299,757 A | 11/1981 | Kuribayashi et al. |
| 4,383,082 A | 5/1983 | Lee, Jr. |
| 4,460,743 A | 7/1984 | Abe et al. |
| 4,480,057 A | 10/1984 | Sano |
| 4,565,684 A | 1/1986 | Tibbetts et al. |
| 4,572,813 A | 2/1986 | Arakawa |
| 4,628,072 A | 12/1986 | Shiraki et al. |
| 4,663,230 A | 5/1987 | Tennent |
| 4,713,416 A | 12/1987 | Del Giudice et al. |
| 4,764,559 A | 8/1988 | Yamauchi et al. |
| 4,772,657 A | 9/1988 | Akiyama et al. |
| 4,816,289 A | 3/1989 | Komatsu et al. |
| 4,863,997 A | 9/1989 | Shibuya et al. |
| 4,876,078 A | 10/1989 | Arakawa et al. |
| 4,892,904 A | 1/1990 | Ting |
| 4,962,148 A | 10/1990 | Orikasa et al. |
| 4,985,495 A | 1/1991 | Nishio et al. |
| 4,990,558 A | 2/1991 | DeNicola, Jr. et al. |
| 4,994,508 A | 2/1991 | Shiraki et al. |
| 5,024,818 A | 6/1991 | Tibbetts et al. |
| 5,061,753 A | 10/1991 | Maruyama et al. |
| 5,071,911 A | 12/1991 | Furuta et al. |
| 5,071,912 A | 12/1991 | Furuta et al. |
| 5,075,376 A | 12/1991 | Furuta et al. |
| 5,079,295 A | 1/1992 | Furuta et al. |
| 5,081,187 A | 1/1992 | Maruyama et al. |
| 5,086,112 A | 2/1992 | Togo et al. |
| 5,106,696 A | 4/1992 | Chundury et al. |
| 5,124,410 A | 6/1992 | Campbell |
| 5,132,363 A | 7/1992 | Furuta et al. |
| 5,149,740 A | 9/1992 | Maruyama et al. |
| 5,159,004 A | 10/1992 | Furuta et al. |
| 5,162,433 A | 11/1992 | Nishio et al. |
| 5,162,435 A | 11/1992 | Shibuya et al. |
| 5,162,440 A | 11/1992 | Akkapeddi et al. |
| 5,165,909 A | 11/1992 | Tennent et al. |
| 5,166,264 A | 11/1992 | Lee, Jr. et al. |
| 5,182,151 A | 1/1993 | Furuta et al. |
| 5,191,024 A | 3/1993 | Shibata et al. |
| 5,206,281 A | 4/1993 | Furuta |
| 5,262,477 A | 11/1993 | Kasai et al. |
| 5,268,425 A | 12/1993 | Furuta et al. |
| 5,272,208 A | 12/1993 | Shiraki et al. |
| 5,272,209 A | 12/1993 | Shiraki et al. |
| 5,278,220 A | 1/1994 | Vermeire et al. |
| 5,286,791 A | 2/1994 | DeNicola, Jr. et al. |
| 5,290,856 A | 3/1994 | Okamoto et al. |
| 5,296,540 A | 3/1994 | Akiyama et al. |
| 5,304,593 A | 4/1994 | Nishio et al. |
| 5,321,081 A | 6/1994 | Chundury et al. |
| 5,369,173 A | 11/1994 | Furuta |
| 5,370,813 A | 12/1994 | DeNicola, Jr. et al. |
| 5,397,822 A | 3/1995 | Lee, Jr. et al. |
| 5,405,902 A | 4/1995 | Nishio et al. |
| 5,418,287 A | 5/1995 | Tanaka et al. |
| 5,424,360 A | 6/1995 | Nagaoka et al. |
| 5,428,091 A | 6/1995 | Abe et al. |
| 5,461,111 A | 10/1995 | Modic et al. |
| 5,473,015 A | 12/1995 | DeNicola, Jr. et al. |

(List continued on next page.)

FOREIGN PATENT DOCUMENTS

| | | |
|---|---|---|
| EP | 0 326 895 A2 | 1/1989 |
| EP | 0 412 787 A2 | 8/1990 |
| EP | 0 765 914 A1 | 5/1995 |
| EP | 1 029 876 | 9/1999 |
| GB | 1 559 262 | 12/1977 |
| JP | 2003277555 A | 10/2003 |
| WO | WO 90/05759 | 5/1990 |
| WO | WO 91/05016 | 4/1991 |

OTHER PUBLICATIONS

Chemical Abstract for JP 2003277555.
U.S. Appl. No. 09/682,919, filed Nov. 1, 2001, Adedeji et al.
U.S. Appl. No. 09/682,921, filed Nov. 1, 2001, Adedeji et al.
U.S. Appl. No. 09/682,923, filed Nov. 1, 2001, Adedeji et al.

(List continued on next page.)

*Primary Examiner*—Duc Truong

(57) ABSTRACT

A thermoplastic composition includes a poly(arylene ether), a poly(alkenyl aromatic) resin, a polyolefin, and a selectively hydrogenated block copolymer of an alkenyl aromatic compound and a conjugated diene having up to about 20 percent residual pendant aliphatic unsaturation and at least about 30 percent residual in-chain aliphatic unsaturation. The composition exhibits an excellent balance of stiffness, impact strength, and heat resistance and is useful for a variety of applications including automotive fascia, automotive front-end modules, automotive grill opening reinforcements, food trays, and power tool casings.

48 Claims, No Drawings

U.S. PATENT DOCUMENTS

| | | | |
|---|---|---|---|
| 5,494,962 | A | 2/1996 | Gauthy et al. |
| 5,589,152 | A | 12/1996 | Tennent et al. |
| 5,591,382 | A | 1/1997 | Nahass et al. |
| 5,648,424 | A | 7/1997 | Miwa et al. |
| 5,705,556 | A | 1/1998 | Djiauw et al. |
| 5,777,028 | A | 7/1998 | Okada et al. |
| 5,902,850 | A | 5/1999 | Chino et al. |
| 5,998,029 | A | 12/1999 | Adzima et al. |
| 6,005,050 | A | 12/1999 | Okada et al. |
| 6,013,726 | A | 1/2000 | Nakano et al. |
| 6,031,049 | A | 2/2000 | Chino et al. |
| 6,045,883 | A | 4/2000 | Akiyama et al. |
| 6,057,401 | A | 5/2000 | Modic |
| 6,258,881 | B1 | 7/2001 | Moritomi |
| 6,300,417 | B1 | 10/2001 | Sue et al. |
| 6,509,412 | B1 | 1/2003 | Hall |
| 2002/0023845 | A1 | 2/2002 | Ding et al. |
| 2003/0181587 | A1 | 9/2003 | Sasagawa et al. |

OTHER PUBLICATIONS

U.S. Appl. No. 09/682,926, filed Nov. 1, 2001, Adedeji et al.
U.S. Appl. No. 09/682,928, filed Nov. 1, 2001, Adedeji et al.
U.S. Appl. No. 09/682,929, filed Nov. 1, 2001, Adedeji et al.
U.S. Appl. No. 09/683,766, filed Feb. 12, 2002, Adedeji et al.
Derwent Abstract for JP 58–93730.
JP 06057008. Publication Date of Jan. 3, 1994. Abstract Only. 1 page.
International Search Report Dated Jan. 22, 2003.
G.–X. Wei, H.–J. Sue, J. Chu, C. Huang, K. Gong, "Morphology and Mechanical Property of Poly(phenylene oxide) Modified Polypropylene Blends", ANTEC '99, vol. III, New York City, May 2–9, 1999, pp. 3443–3447.
M. K. Akkapeddi and B. VanBuskirk, Adv. Polym. Technol. (1992), vol. 11, No. 4, pp. 263–275.
Derwent Abstract for JP 63–113049.
Chemical Abstracts Record for JP 03181555.
Chemical Abstracts Record for JP 03185058.
Chemical Abstracts Record for JP 03231962.
Chemical Abstract Record for JP 04183748.
Chemical Abstracts Record for JP 07165998.
Chemical Abstracts Record for JP 07166026.
TUFTEC® H1043 Technical Bulletin, Dec. 16, 1999, Asahi Chemical Industry Co., Ltd., pp. 1–5.
TUFTEC® P–Series High Performance Thermoplastic Elastomer, pp. 1–2. <http: www.asahi–kasel.co.jp/plastic/e/technical/br/p–series.htm>.
Derwent Abstract Record for JP 01–098647.
Derwent Abstract Record for JP 03–259941.
Derwent Abstract Record for JP 04–007357.
Derwent Abstract Record for JP 04–028739.
U.S. Appl. No. 09/682,929, filed Nov. 1, 2001, Adedeji et al.
Derwent Abstract Record for JP 04–028740.
Derwent Abstract Record for JP 04–279697.
Derwent Abstract Record for JP 04–293942.
Derwent Abstract Record for JP 05–070679.
Derwent Abstract Record for JP 05–295184.
Derwent Abstract Record for JP 06–009828.
Derwent Abstract Record for JP 06–016924.
Derwent Abstract Record for JP 06–057130.
Derwent Abstract Record for JP 06–136202.
Derwent Abstract Record for JP 07–003083.
Derwent Abstract Record for JP 07–304908.
Derwent Abstract Record for JP 09–316322.
Derwent Abstract Record for JP 11–060836.
Derwent Abstract Record for JP 63–113047.
Derwent Abstract Record for JP 63–113050.
Derwent Abstract Record for JP 2000–143891.

POLY(ARYLENE ETHER)-POLYOLEFIN COMPOSITION, METHOD FOR THE PREPARATION THEREOF, AND ARTICLES DERIVED THEREFROM

CROSS REFERENCE TO RELATED APPLICATIONS

This application claims priority to U.S. Provisional Application No. 60/300,794 filed 25 Jun. 2001.

BACKGROUND

Compositions comprising poly(arylene ether)s and polyolefins are known in the art, and compositions comprising specific impact modifiers and compatibilizing agents have been described.

U.S. Pat. No. 4,713,416 to Del Giudice et al. generally describes compositions comprising (a) a polyphenylene ether, (b) a thermoplastic polymer incompatible with the PPE, and (c) a polymeric compatibility-promoting agent comprising one or more blocks of vinylaromatic monomer units compatible with the polyphenylene ether (a) and one or more blocks of monomeric units of the same nature as the thermoplastic polymer (b) or compatible with that polymer.

U.S. Pat. No. 4,764,559 to Yamauchi et al. generally describes a composition comprising (a) a polyphenylene ether having a low degree of polymerization, with or without a styrene resin, (b) a polyolefin, and (c) a styrene compound/conjugated diene block copolymer or a hydrogenation product thereof.

U.S. Pat. No. 4,863,997 to Shibuya et al. generally describes a composition comprising (a) a polyolefin resin, (b) a polyphenylene ether resin, and (c) a hydrogenated block copolymer of an alkenyl aromatic compound and a conjugated diene which contains 45–80 weight percent of a repeating unit derived from the alkenyl aromatic compound.

U.S. Pat. No. 4,994,508 to Shiraki et al. generally describes a composition comprising (a) 1–99 parts by weight of a specific hydrogenated block copolymer having at least one polymer block composed mainly of a vinyl aromatic compound and at least one polymer block composed mainly of a conjugated diene compound, and (b) 99–1 parts by weight of at least one thermoplastic substance selected from the group consisting of tackifier resins, thermoplastic resins, and bituminous materials. Thermoplastic resins include polyethylenes, polypropylenes, and polyphenylene ethers, among many others.

U.S. Pat. No. 5,071,912 to Furuta et al. generally describes a composition comprising (a) a polyphenylene ether, (b) a styrene-modified propylene polymer or a composition containing a styrene-modified propylene polymer and polypropylene, and (c) at least two rubbery substances, one being compatible with (a) and the other incompatible with (a).

U.S. Pat. No. 5,081,187 to Maruyama et al. generally describes a composition comprising specific amounts of (a) a polyolefin, (b) a polyphenylene ether, (c) a partially hydrogenated alkenyl aromatic compound-isoprene block copolymer, and (d) an alkenyl aromatic compound-conjugated diene block copolymer.

U.S. Pat. No. 5,418,287 to Tanaka et al. generally describes a composition comprising (a) a polyphenylene ether, (b) a crystalline polyolefin resin, and (c) a graft copolymer where the backbone is a copolymer of (i) ethylene or at least one $C_3$–$C_{12}$ alpha-olefin, and (ii) at least one chain nonconjugated diene.

U.S. Pat. No. 6,031,049 to Chino et al. generally describes a composition comprising specific amounts of (a) a component composed of syndiotactic polystyrene and a polyolefin, (b) a block or graft styrene-olefin copolymer having a styrene content of 40 to 85% by weight, and (c) a polyphenylene ether.

European Patent Application No. 412,787 A2 to Furuta et al. generally describes compositions comprising (a) a polyphenylene ether, (b) a propylene polymer modified by grafting with a styrene-based monomer alone or in combination with another copolymerizable monomer, with or without an unmodified propylene polymer, and (c) a rubbery substance having chain A miscible with all or part of (a) and chain B miscible with all or part of (b).

The commercial value of the above described compositions has been limited by deficiencies in the balance of properties such as stiffness, impact strength, and heat resistance, as well as the inconsistency of various properties from batch to batch and from molded sample to molded sample within the same batch. There remains a need for poly(arylene ether)-polyolefin compositions having improved property balances. In particular, there remains a need for poly(arylene ether)-polypropylene compositions exhibiting an improved balance of stiffness, impact strength, and heat resistance. There also remains a need for poly(arylene ether)-polypropylene compositions exhibiting reduced batch-to-batch and sample-to-sample variability in key properties, including stiffness and impact strength.

BRIEF SUMMARY

The above-described and other drawbacks and disadvantages of the related art are alleviated by a thermoplastic composition, comprising: a poly(arylene ether); a poly(alkenyl aromatic) resin in an amount of at least about 30 weight percent of the total of the poly(arylene ether) and the poly(alkenyl aromatic) resin; a polyolefin; and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

Another embodiment of the invention is a thermoplastic composition, comprising: a poly(arylene ether); a poly(alkenyl aromatic) resin in an amount of at least about 30 weight percent of the total of the poly(arylene ether) and the poly(alkenyl aromatic) resin; a polyolefin; a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation; and a reinforcing filler.

Another embodiment of the invention is a thermoplastic composition comprising: a poly(arylene ether); a poly(alkenyl aromatic) resin; a polyolefin; a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation; and a polypropylene-polystyrene graft copolymer or an unhydrogenated block copolymer of an alkenyl aromatic compound and a conjugated diene.

The present inventors have surprisingly discovered that their compositions provide a substantial reduction in property variability compared to known compositions. The present compositions also provide a beneficial balance between stiffness and impact strength. Other embodiments, including methods of forming the composition and articles comprising the composition, are described below.

DETAILED DESCRIPTION OF THE PREFERRED EMBODIMENTS

A thermoplastic composition having an excellent balance of stiffness and impact strength, as well as reduced property variability, comprises: a poly(arylene ether); a poly(alkenyl aromatic) resin in an amount of at least about 30 weight percent of the total of the poly(arylene ether) and the poly(alkenyl aromatic) resin; a polyolefin; and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula:

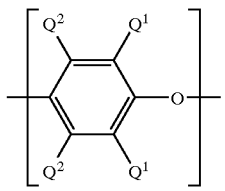

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_1$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly (arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally has an intrinsic viscosity of about 0.2 to about 0.6 deciliters per gram (dL/g), with the upper limit of the intrinsic viscosity preferable being about 0.5 dL/g, more preferably about 0.47 dL/g, and with the lower limit of the intrinsic viscosity preferably being about 0.3 dL/g, as measured in chloroform at 25° C. It is also possible to utilize a high intrinsic viscosity poly (arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The composition may comprise poly(arylene ether) in an amount of about 10 to about 59 weight percent, based on the total weight of the composition. Within this range, it may be preferred to use a poly(arylene ether) amount of at least about 18 weight percent. Also within this range, it may be preferred to use a poly(arylene ether) amount of up to about 50 weight percent, more preferably up to about 40 weight percent.

The composition further comprises a poly(alkenyl aromatic) resin. The term "poly (alkenyl aromatic) resin" as used herein includes polymers prepared by methods known in the art including bulk, suspension, and emulsion polymerization, which contain at least 25% by weight of structural units derived from an alkenyl aromatic monomer of the formula:

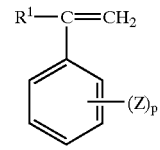

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrenes such as p-chlorostyrene, and methylstyrenes such as p-methylstyrene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber-modifier and a homopolymer of an alkenyl aromatic monomer (as described above), wherein the rubber modifier may be a polymerization product of at least one $C_4$–$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, preferably about 88 to about 94 weight percent of the homopolymer of an alkenyl aromatic monomer and about 6 to about 12 weight percent of the rubber modifier.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA® (e.g., QUESTRA® WA550) from Dow Chemical Company. Highly preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content of about 10% to about 35%. These rubber-modified polystyrenes are commercially available as, for example, GEH 1897 from General Electric Plastics, and BA 5350 from Chevron.

The composition may comprise the poly(alkenyl aromatic) resin in an amount of about 1 to about 46 weight percent, with the proviso that the poly(alkenyl aromatic) resin constitutes at least about 30 weight percent, of the total of the poly(arylene ether) and the poly(alkenyl aromatic) resin. Within this range, it may be preferable to use the poly(alkenyl aromatic) resin in an amount of at least about preferably about 3 weight percent, based on the total weight of the composition.

In one embodiment, the amount of poly(alkenyl aromatic) resin may be expressed as a fraction of the total of poly(arylene ether) and poly(alkenyl aromatic) resin. The composition may preferably comprise poly(alkenyl aromatic) resin in an amount of about 30 to about 80 weight percent, based on the combined weight of poly(arylene ether) and poly(alkenyl aromatic) resin. Within this range, it may be preferred to use a poly(alkenyl aromatic) resin amount up to about 70 weight percent, more preferably up to about 65 weight percent. Also within this range, it may be preferred to use a poly(alkenyl aromatic) resin amount of at least about 30 weight percent, more preferably at least about 40 weight percent. When the amount of poly(alkenyl aromatic) resin is less than about 30 weight percent of the total of the poly(arylene ether) and poly(alkenyl aromatic) resin, the composition after molding may be deficient in flexural modulus. When the amount of poly(alkenyl aromatic) resin is greater than about 80 weight percent of the total of the poly(arylene ether) and poly(alkenyl aromatic) resin, the composition after molding may be deficient in heat distortion temperature. The proportions of poly(alkenyl aromatic) resin and poly(arylene ether) may be manipulated to control the glass transition temperature ($T_g$) of the single phase comprising these two components relative to the Tg of the poly(arylene ether) alone, or relative to the melting temperature ($T_m$) of the polyolefin alone. For example, the relative amounts of poly(alkenyl aromatic) resin and poly(arylene ether) may be chosen so that the poly(arylene ether) and the poly(alkenyl aromatic) resin form a single phase having a glass transition temperature at least about 20° C. greater, preferably at least about 30° C. greater, than the glass transition temperature of the poly(alkenyl aromatic) resin alone, which may be, for example, about 100° C. to about 110° C. Also, the relative amounts of poly(alkenyl aromatic) resin and poly(arylene ether) may be chosen so that the poly(arylene ether) and the poly(alkenyl aromatic) resin form a single phase having a glass transition temperature up to about 15° C. greater, preferably up to about 10° C. greater, more preferably up to about 1° C. greater, than the $T_m$ of the polyolefin alone. The relative amounts of poly(alkenyl aromatic) resin and poly(arylene ether) may be chosen so that the poly(arylene ether) and the poly(alkenyl aromatic) resin form a single phase having a glass transition temperature of about 130° C. to about 180° C.

The composition further comprises a polyolefin. The polyolefin may be a homopolymer or copolymer having at least about 80 weight percent of units derived from polymerization of ethylene, propylene, butylene, or a mixture thereof. Examples of polyolefin homopolymers include polyethylene, polypropylene, and polybutylene. Examples of polyolefin copolymers include random, graft, and block copolymers of ethylene, propylene, and butylene with each other, and further comprising up to 20 weight percent of units derived from $C_5$–$C_{10}$ alpha olefins (excluding aromatic alpha-olefins). Polyolefins further include blends of the above homopolymers and copolymers. Preferred polyolefins may have a flexural modulus of at least about 100,000 pounds per square inch (psi) at 73° F. as measured according to ASTM D790. Suitable polyolefins may comprise, for example, the linear low density polyethylene available from ExxonMobil as LL-6201, the low density polyethylene available from ExxonMobil as LMA-027, the high density polyethylene available from ExxonMobil as HD-6605, the ultra-high molecular weight polyethylene available as Type 1900 from Montell Polyolefins, and the polybutylene (polybutene-1) available as PB0110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM D1238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The composition may comprise polyolefin in an amount of about 10 to about 70 weight percent, preferably about 10 to about 60 weight percent, more preferably about 10 to about 50 weight percent, based on the total weight of the composition.

The composition comprises a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation. For brevity, this component is hereinafter referred to as the "selectively hydrogenated block copolymer". The selectively hydrogenated block copolymer is a copolymer comprising (A) at least one block derived from an alkenyl aromatic compound and (B) at least one block derived from a conjugated diene, in which the aliphatic unsaturated group content in the block (B) has been selectively reduced by hydrogenation. In particular, in-chain aliphatic unsaturation (i.e., aliphatic unsaturation resulting from 1,4-incorporation of the conjugated diene to the copolymer) remains at least about 30 percent unhydrogenated, preferably at least about 40 percent unhydrogenated, more preferably at least about 50 percent unhydrogenated; and pendant aliphatic unsaturation (i.e., aliphatic unsaturation resulting from 1,2-incorporation of the conjugated diene to the copolymer) remains up to about 20 percent unhydrogenated, preferably up about 10 percent unhydrogenated, more preferably up to about 5 percent unhydrogenated. In one embodiment, the ratio of the percentage of unhydrogenated in-chain aliphatic unsaturation to the percentage of unhydrogenated pendant aliphatic unsaturation is at least about 2, preferably at least about 5, more preferably at least about 10. The selective hydrogenation is illustrated in the Scheme below for the example of selective hydrogenation of a styrene-butadiene-styrene block copolymer.

structure are linear structures embracing diblock (A-B block), triblock (A-B-A block or B-A-B block), tetrablock (A-B-A-B block), and pentablock (A-B-A-B-A block or B-A-B-A-B block) structure as will as linear structure containing 6 or more blocks in total of A and B. More preferred are diblock, triblock, and tetrablock structures, with the A-B-A triblock structure being particularly preferred.

The alkenyl aromatic compound providing the block (A) is represented by formula:

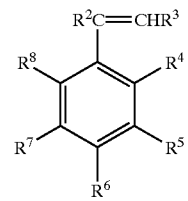

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the fore-

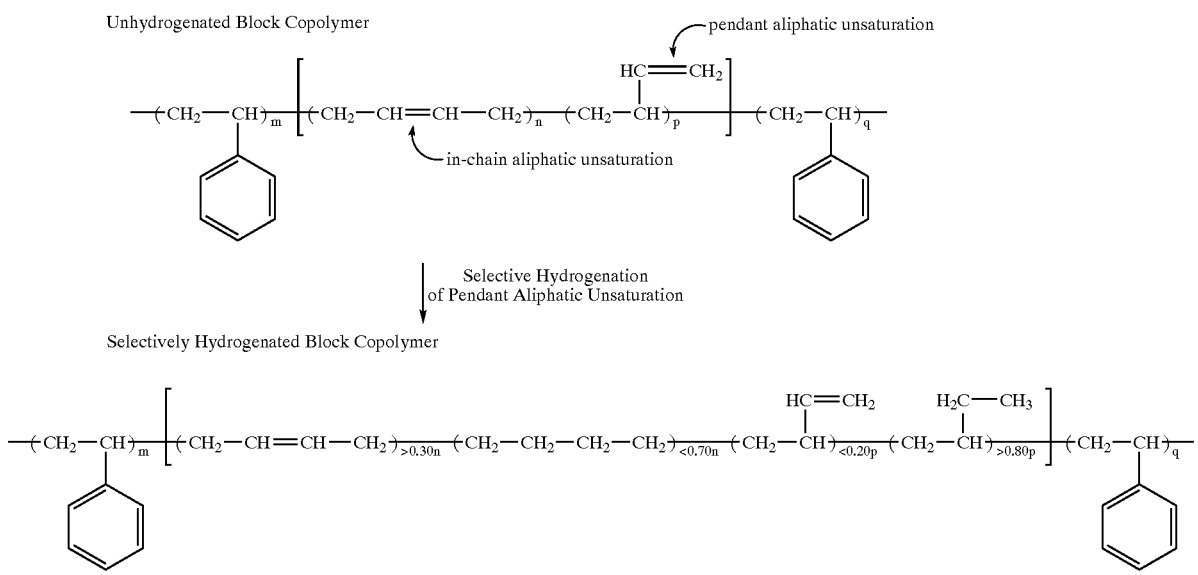

The degree of hydrogenation of in-chain and pendant aliphatic unsaturation may be evaluated by a variety of methods, including infrared spectroscopy, and $^1$H and $^{13}$C nuclear magnetic resonance (NMR) spectroscopies.

The arrangement of blocks (A) and (B) includes a linear structure, a grafted structure, and a radial teleblock structure with or without a branched chain. Preferred among these going alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the selectively hydrogenated block copolymer may contain a small proportion of a lower olefinic hydrocarbon such as, for example, ethylene, propylene, 1-butene, dicyclopentadiene, a non-conjugated diene, or the like.

The content of the repeating unit derived from the alkenyl aromatic compound in the selectively hydrogenated block copolymer may be about 20 to about 90 weight percent, based on the total weight of the selectively hydrogenated block copolymer. Within this range, the alkenyl aromatic content may preferably be at least about 30 weight percent, more preferably at least about 55 weight percent. Also within this range, the alkenyl aromatic content may preferably be up to about 80 weight percent, more preferably up to about 75 weight percent.

There is no particular limitation on the mode of incorporation of the conjugated diene in the selectively hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer preferably may have a number average molecular weight of about 5,000 to about 500,000 g/mol, as determined by gel permeation chromatography (GPC) using polystyrene standards. The molecular weight distribution of the selectively hydrogenated block copolymer as measured by GPC is not particularly limited. The copolymer may have any ratio of weight average molecular weight to number average molecular weight.

Particularly preferred selectively hydrogenated block copolymers are the styrene-(butadiene-butylene) diblock and styrene-(butadiene-butylene)-styrene triblock copolymers obtained by highly selective hydrogenation of styrene-butadiene and styrene-butadiene-styrene triblock copolymers, respectively. For example, styrene-(butadiene-butylene)-styrene triblock copolymers result when the pendant unsaturation in the styrene-butadiene-styrene triblock copolymer precursor is essentially completely hydrogenated (i.e., at least about 95% hydrogenated; preferably at least about 98% hydrogenated), whereas the in-chain unsaturation remains at least about 30% unhydrogenated.

The selectively hydrogenated block copolymer may be synthesized by block polymerization followed by hydrogenation as described, for example, in U.S. Pat. No. 4,994,508 to Shiraki et al. Suitable selectively hydrogenated block copolymers include the styrene-(butadiene-butylene)-styrene triblock copolymers commercially available from Asahi Chemical as, for example, TUFTEC® P-series copolymers.

The composition may comprise the selectively hydrogenated block copolymer in an amount of about 1 to about 20 weight percent, preferably about 1 to about 15 weight percent, more preferably about 1 to about 12 weight percent, based on the total weight of the composition.

The composition may, optionally, further comprise a polypropylene-polystyrene graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$–$C_{10}$ olefins, provided that, when the olefin is ethylene, the maximum polymerized ethylene content is about 10 weight percent, preferably about 4 weight percent, and when the olefin is a $C_4$–$C_{10}$ olefin, the maximum polymerized content of the $C_4$–$C_{10}$ olefin is about 20 weight percent, preferably about 16 weight percent; (c) a random terpolymer of propylene and at least two olefins selected from the group consisting of ethylene and $C_4$–$C_{10}$ alpha-olefins, provided that the maximum polymerized $C_4$–$C_{10}$ alpha-olefin content is about 20 weight percent, preferably about 16 weight percent, and, when ethylene is one of the olefins, the maximum polymerized ethylene content is about 5 weight percent, preferably about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being in the range of about from 5 to 30 weight percent, and the ethylene content of the rubber being in the range of about from 7 to 70 weight, and preferably about from 10 to 40 weight percent. The $C_4$–$C_{10}$ olefins include the linear and branched $C_4$–$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material within the broadest aspects of the present invention. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$–$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about from 1 to 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent, of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When present, the polypropylene-polystyrene graft copolymer may be used in an amount of about 0.5 to about 15 weight percent, preferably about 0.5 to about 10 weight percent, more preferably about 0.5 to about 8 weight percent, based on the total weight of the composition.

The composition may, optionally, further comprise an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent, preferably about 40 to about 60 weight percent, ethylene and about 75 to about 25 weight percent, preferably about 60 to about 40 weight percent, alpha-olefin. The ethylene/alpha-olefin elastomeric copolymer may typically have a melt flow index of about 0.1 to about 20 g/10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON® 878 by ExxonMobil Chemical and the ethylene-butylene rubber sold as EXACT® 4033 by ExxonMobil Chemical. Ethylene/alpha-olefin elastomeric copolymers may also be obtained commercially as blends in polypropylene as, for example, the ethylene-propylene rubber pre-dispersed in polypropylene sold as product numbers Profax 7624 and Profax 8023 from Basell, and the ethylene-butene rubber pre-dispersed in polypropylene sold as Cat-alloy K021P from Basell.

When present, the ethylene/alpha-olefin elastomeric copolymer may be used in an amount of about 1 to about 20 weight percent, preferably about 1 to about 15 weight percent, more preferably about 3 to about 15 weight percent, based on the total weight of the composition.

In one embodiment, the amount of ethylene/alpha-olefin elastomeric copolymer may be expressed as a fraction of the total of polyolefin and ethylene/alpha-olefin elastomeric copolymer. Thus, when the ethylene/alpha-olefin elastomeric copolymer is present, its amount may be expressed as about 1 to about 60 weight percent, preferably about 10 to about 40 weight percent, based on the combined weight of polyolefin and ethylene/alpha-olefin elastomeric copolymer.

The composition may, optionally, further comprise an unhydrogenated block copolymer of alkenyl aromatic compound and a conjugated diene (referred to hereinafter as an "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks, with about 50 to about 80 weight percent being preferred.

Particularly preferred unhydrogenated block copolymers included styrene-butadiene-styrene triblock copolymers.

Suitable unhydrogenated block copolymers may be prepared by known methods or obtained commercially as, for example, KRATON® D series polymers, including KRATON® D1101 and D1102, from Kraton Polymers (formerly a division of Shell Chemical). Suitable unhydrogenated block copolymers further include the styrene-butadiene radial teleblock copolymers available as, for example, K-RESIN® KR01, KR03, KR05, and KR10 sold by Chevron Phillips Chemical Company.

When present, the unhydrogenated block copolymers may be used at about 1 to about 20 weight percent, preferably about 1 to about 15 weight percent, more preferably about 1 to about 10 weight percent, of the total weight of the composition.

The composition may, optionally, further comprise a fully hydrogenated block copolymer of an alkenyl aromatic compound and a conjugated diene. The fully hydrogenated block copolymer may be the hydrogenation product of the unhydrogenated block copolymer described above. By fully hydrogenated, it is meant that up to about 20%, more preferably up to about 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%. The alkenyl aromatic content of the fully hydrogenated block copolymer may be about 10 weight percent to about 90 weight percent, based on the total weight of the fully hydrogenated block copolymer. Within this range, it may be preferred to use a fully hydrogenated block copolymer having an alkenyl aromatic content of at least about 30 weight percent, more preferably at least about 55 weight percent. Also within this range, it may be preferred to use a fully hydrogenated block copolymer having an alkenyl aromatic content of up to about 80 weight percent, more preferably up to about 75 weight percent. For the fully hydrogenated block copolymer, the alkenyl aromatic compound and the conjugated diene compound are the same as those defined above for the selectively hydrogenated block copolymer. Fully hydrogenated block copolymers are commercially available as, for example, KRATON® G1650 and G1652 from Kraton Polymers, and TUFTEC® H1043 from Asahi Chemical. When present, the fully hydrogenated block copolymer may be used at about 1 weight percent to about 20 weight percent, based on the total weight of the composition.

The composition may, optionally, further comprise a reinforcing filler. Reinforcing fillers may include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, vapor-grown carbon fibers, and especially graphitic vapor-grown carbon fibers having average diameters of about 3 to about 500 nanometers (see, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.); potassium titanate single-crystal fibers, silicon carbide fibers, boron carbide fibers, gypsum fibers, aluminum oxide fibers, asbestos, iron fibers, nickel fibers, copper fibers, wollastonite fibers; and the like. The reinforcing fillers may be in the form of glass roving cloth, glass cloth, hydrogenated block copolymer may be the hydrogenation product of the unhydrogenated block copolymer described above. By fully hydrogenated, it is meant that up to about 20%, more preferably up to about 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%. The alkenyl aromatic content of the fully hydrogenated block copolymer may be about 10 weight percent to about 90 weight percent, based on the total weight of the fully hydrogenated block copolymer. Within this range, it may be preferred to use a fully hydrogenated block copolymer having an alkenyl aromatic content of at least about 30 weight percent, more preferably at least about 55 weight percent. Also within this range, it may be preferred to use a fully hydrogenated block copolymer having an alkenyl aromatic content of up to about 80 weight percent, more preferably up to about 75 weight percent. For the fully hydrogenated block copolymer, the alkenyl aromatic compound and the conjugated diene compound are the same as those defined above for the selectively hydrogenated block copolymer. Fully hydrogenated block copolymers are commercially available as, for example, KRATON® G1650 and G1652 from Kraton Polymers, and TUFTEC® H1043 from Asahi Chemical. When present, the fully hydrogenated block copolymer may be used at about 1 weight percent to about 20 weight percent, based on the total weight of the composition.

The composition may, optionally, further comprise a reinforcing filler. Reinforcing fillers may include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, vapor-grown carbon fibers, and especially graphitic vapor-grown carbon fibers having average diameters of about 3 to about 500 nanometers (see, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.); potassium titanate single-crystal fibers, silicon carbide fibers, boron carbide fibers, gypsum fibers, aluminum oxide fibers, asbestos, iron fibers, nickel fibers, copper fibers, wollastonite fibers; and the like. The reinforcing fillers may be in the form of glass roving cloth, glass cloth, chopped glass, hollow glass fibers, glass mat, glass surfacing mat, and non-woven glass fabric, ceramic fiber fabrics, and metallic fiber fabrics. In addition, synthetic organic reinforcing fillers may also be used including organic polymers capable of forming fibers. Illustrative examples of such reinforcing organic fibers are poly(ether ketone), polyimide benzoxazole, poly(phenylene sulfide), polyesters, aromatic polyamides, aromatic polyimides or polyetherimides, acrylic resins, and poly(vinyl alcohol). Fluoropolymers such as polytetrafluoroethylene, may be used. Also included are natural organic fibers known to one skilled in the art, including cotton cloth, hemp cloth, and felt, carbon fiber fabrics, and natural cellulosic fabrics such as Kraft paper, cotton paper, and glass fiber containing paper. Such reinforcing fillers could be in the form of monofilament or multifilament fibers and could be used either alone or in combination with another type of fiber, through, for example, coweaving or core-sheath, side-by-side, orange-type or matrix and fibril constructions or by other methods known to one skilled in the art of fiber manufacture. They may be in the form of, for example, woven fibrous reinforcements, non-woven fibrous reinforcements, or papers.

Preferred reinforcing fillers include glass fibers. Preferred glass fibers may have diameters of about 2 to about 25 micrometers, more preferably about 10 to about 20 micrometers, yet more preferably about 13 to about 18 micrometers. The length of the glass fibers may be about 0.1 to about 20 millimeters, more preferably about 1 to about 10 millimeters, yet more preferably about 2 to about 8 millimeters. Glass fibers comprising a sizing to increase their compatibility with the polyolefin or the poly (arylene ether) are particularly preferred. Suitable sizings are described, for example, in U.S. Pat. No. 5,998,029 to Adzima et al. Suitable glass fibers are commercially available as, for example, product numbers 147A-14P (14 micrometer diameter) and 147A-17P (17 micrometer diameter) from Owens Corning.

Preferred reinforcing fillers further include talc. There are no particular limitations on the physical characteristics of the talc. Preferred talcs may have an average particle size of about 0.5 to about 25 micrometers. Within this range, it may be preferred to use a talc having an average particle size up to about 10 micrometers, more preferably up to about 5 micrometers. For some uses of the composition, it may be preferred to employ a talc that is F.D.A. compliant (i.e., compliant with U.S. Food and Drug Administration regulations). Suitable talcs include, for example, the F.D.A. compliant talc having an average particle size of about 3.2 micrometers sold as CIMPACT® 610(C) from Luzenac.

The compatibility of the reinforcing filler and the polyolefin may be improved not just with sizings on the surface of the reinforcing fillers, but also by adding to the composition a graft copolymer comprising a polyolefin backbone and polar grafts formed from one or more cyclic anhydrides. Such materials include graft copolymers of polyolefins and $C_4$–$C_{12}$ cyclic anhydrides, such as, for example, those available from ExxonMobil under the tradename EXXELOR® and from DuPont under the tradename FUSABOND®. Examples of suitable polyolefin-graft-poly(cyclic anhydride) copolymers are the polypropylene-graft-poly (maleic anhydride) materials supplied by ExxonMobil as EXXELOR® PO1020 and by DuPont as FUSABOND® M613-05. Suitable amounts of such materials may be readily determined and are generally about 0.1 to about 10 weight percent, based on the total weight of the composition. Within this range, polyolefin-graft-poly(cyclic anhydride) copolymer amounts of at least about 0.5 weight percent may be preferred. Also within this range, polyolefin-graft-poly (cyclic anhydride) copolymer amounts of up to about 5 weight percent may be preferred, and amounts up to about 2 weight percent may be more preferred.

When present, the reinforcing filler may be used in an amount of about 1 to about 50 weight percent, preferably about 5 to about 50 weight percent, based on the total weight of the composition.

In addition to the components described above, the composition may comprise one or more additives known in the art. Such additives may include, for example, stabilizers, mold release agents, processing aids, flame retardants, drip retardants, nucleating agents, UV blockers, dyes, pigments, particulate fillers (i.e., fillers having an aspect ratio less than about 3), conductive fillers (e.g., conductive carbon black, and vapor grown carbon fibers having an average diameter of about 3 to about 500 nanometers), antioxidants, anti-static agents, blowing agents, and the like. Such additives are well known in the art and appropriate amounts may be readily determined.

In a preferred embodiment, the composition comprises: a poly(arylene ether); a poly(alkenyl aromatic) resin; a polyolefin; and a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and wherein the poly(arylene ether) and the poly(alkenyl aromatic) resin are present in a single phase having a glass transition temperature at least about 20° C. greater than the glass transition temperature of the poly (alkenyl aromatic) resin alone.

In another preferred embodiment, the composition comprises: a poly(arylene ether); a poly(alkenyl aromatic) resin; a polyolefin; and a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and wherein the poly(arylene ether) and the poly(alkenyl aromatic) resin are present in a single phase having a glass transition temperature no more than about 15° C. greater than the melting temperature of the polyolefin alone.

In another preferred embodiment, the composition comprises: a poly(arylene ether); a poly(alkenyl aromatic) resin; a polyolefin; and a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and wherein the poly(arylene ether) and the poly(alkenyl aromatic) resin are present in a single phase having a glass transition temperature of about 130° C. to about 180° C.

In another preferred embodiment, the composition comprises: a poly(arylene ether); a poly(alkenyl aromatic) resin; a polyolefin; a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and a polypropylene-polystyrene graft copolymer or an unhydrogenated block copolymer of an alkenyl aromatic compound and a conjugated diene.

In another preferred embodiment, the composition comprises: about 10 to about 59 weight percent of a poly(arylene ether); about 3 to about 46 weight percent of a poly(alkenyl aromatic) resin, with the proviso that the poly(alkenyl aromatic) resin accounts for at least about 30 weight percent of the total of the poly(arylene ether) and the poly(alkenyl aromatic) resin; about 10 to about 40 weight percent of a polyolefin; and about 1 to about 20 weight percent of a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; wherein all weight percents are based on the total weight of the composition.

In another preferred embodiment, the composition comprises: about 10 to about 59 weight percent of a poly(arylene ether); about 1 to about 46 weight percent of a poly(alkenyl aromatic) resin; about 10 to about 40 weight percent of a polyolefin; about 1 to about 20 weight percent of a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and about 0.5 to about 10 weight percent of a polypropylene-polystyrene graft copolymer; wherein all weight percents are based on the total weight of the composition.

In another preferred embodiment, the composition comprises: about 10 to about 59 weight percent of a poly(arylene ether); about 1 to about 46 weight percent of a polystyrene; about 1 to about 20 weight percent of an unhydrogenated block copolymer of alkenyl aromatic compound and a conjugated diene; about 10 to about 40 weight percent of a polyolefin; about 1 to about 20 weight percent of an ethylene/alpha-olefin elastomeric copolymer; about 1 to about 20 weight percent of a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and about 0.5 to about 10 weight percent of a polypropylene-polystyrene graft copolymer; wherein all weight percents are based on the total weight of the composition.

As the composition is defined as comprising multiple components, it will be understood that each component is chemically distinct, particularly in the instance that a single chemical compound may satisfy the definition of more than one component.

The preparation of the compositions of the present invention is normally achieved by merely blending the ingredients under conditions for the formation of an intimate blend. Such conditions often include mixing in single or twin screw type extruders or similar mixing devices that can apply a shear to the components.

Preferred blending methods are similar to those described in detail in U.S. application Ser. No. 09/682929 filed 11 Nov. 2001, which is incorporated herein in its entirety. In particular, the methods of the cited application may be adapted by substituting the selectively hydrogenated block copolymer of the present application for the hydrogenated block copolymer of the cited application. In a preferred embodiment, the components are blended in an extruder having at least two addition ports, with at least about 50%, preferably at least about 75%, more preferably all of the poly(arylene ether) added upstream, and at least about 50%, preferably at least about 75%, yet more preferably 100%, of the polyolefin added downstream. In another preferred embodiment, the components are blended using at least two mixing stages, comprising upstream mixing and downstream mixing, wherein the upstream mixing is high-energy mixing characterized by at least two mixing elements and/or a mixing section not less than about 1 inch in length. Downstream mixing may be either high-energy mixing as described above or low-energy mixing, depending on the composition and desired properties of the composition. When the composition comprises reinforcing fillers, they may preferably be added downstream in combination with the polyolefin, or downdownstream after the downstream addition of the polyolefin.

The composition is suitable for the formation of articles or components of articles using a variety of molding techniques such as, for example, injection molding, blow molding, extrusion, sheet extrusion, film extrusion, profile extrusion, pultrusion, compression molding, thermoforming, pressure forming, hydroforming, vacuum forming, foam molding, and the like. When articles are formed from the composition using blow molding, density reductions as high as about 95% may be achieved.

Useful articles comprising the composition or its reaction products include, for example, automotive fascia, automotive front-end modules, automotive grill opening reinforcements, food trays, and power tool casings.

The composition exhibits improved property balances. In particular, the composition exhibits an improved balance between stiffness, impact strength, and heat resistance. For example, the composition may exhibit a flexural modulus at 73° F., measured according to ASTM D790, of at least about 100 kilopounds per square inch (kpsi), preferably at least about 200 kpsi; a heat distortion temperature measured at 264 psi according to ASTM D648 of at least about 150° F., preferably at least about 200° F., more preferably at least about 250° F.; an Izod notched impact strength measured on ⅛ inch bars at 73° F. according to ASTM D256 of at least about 1 foot-pound/inch (ft-lb/in), preferably at least about 2 ft-lb/in, more preferably at least about 5 ft-lb/in; and a Dynatup Total Energy at 73° F., measured according to ASTM D3763, of at least about 10 foot-pounds (ft-lb), preferably at least about 15 ft-lb, more preferably at least about 20 ft-lb.

The composition may exhibit low variability in properties, whether from batch-to-batch, or from sample-to-sample for a given batch. Variability may be calculated in percentage form as 100 times a property's standard deviation divided by the property's mean. The composition may exhibit sample-to-sample variability in Dynatup Total Energy at 73° F. of less than about 15%, preferably less than about 10%. The composition may exhibit sample-to-sample variability in Flexural Modulus at 73° F. of less than about 10 percent, preferably less than about 5%, more preferably less than about 3%. The composition may exhibit batch-to-batch variability in Izod Notched Impact Strength measured at 73° F. according to ASTM D256 less than about 10%, preferably less than about 5%.

The invention is further illustrated by the following non-limiting examples.

EXAMPLES 1–10, COMPARATIVE EXAMPLES 1–10

Components utilized in the preparation of the thermoplastic composition are listed and described in Table 1.

TABLE 1

| Abbreviation | Description |
| --- | --- |
| PP, PD403 | isotactic propylene polymer obtained as PD403 (pellet form) from Montell Polyolefin Inc. |
| EBR | Ethylene-butylene copolymer, obtained as EXACT ® 4033 (pellet form) from ExxonMobil Chemical |
| PP-EPR, HECO-20 | Polypropylene with ethylene-propylene rubber (EPR) as heterophasic/pre-dispersed, EPR content = 20 weight %, obtained as Profax 7624 (pellet form) from Montell Polyolefin Inc. |
| PP-g-PS | Polypropylene-polystyrene graft copolymer, obtained as Interloy P1045H1 (pellet form) from Montell Polyolefin Inc. |
| PPE | poly(2,6-dimethylphenylene ether), intrinsic viscosity (IV) = 0.46 dl/g, obtained in powdered form from General Electric Company |
| xPS | homopolystyrene, obtained as Huntsman 203 (pellet form) from Huntsman Chemical |
| HIPS | rubber-modified polystyrene (also known as high-impact polystyrene or HIPS), having a polystyrene molecular weight of 230,000 g/mol and 10.3 weight % polybutadiene, obtained GEH 1897 (pellet form) from General Electric Company |
| SBS | unhydrogenated styrene-butadiene-styrene triblock copolymer having about 31 weightt % polystyrene, obtained as KRATON ® D1101 (pellet from) from Shell Chemical Company |
| SBBS | styrene-(butadiene-butylene)-styrene triblock copolymer; obtained as experimental TUFTEC ® JT82P from Asahi; $^1$H-NMR analysis indicated 69 wt % polystyrene, 10 wt % polyethylene, 10 wt % polybutylene, 10 wt % polybutadiene* |
| SEBS, G1652 | hydrogenated styrene-butadiene-styrene triblock copolymer (also known as styrene-(ethylene-butadiene)-styrene triblock copolymer), 28 weight % polystyrene, obtained as KRATON ® G1652 (pellet form) from Shell Chemical Company |
| SEBS, H1043 | hydrogenated styrene-butadiene-styrene triblock copolymer (also known as styrene-(ethylene-butylene)-styrene triblock copolymer), obtained as TUFTEC ® H1043 (pellet form) from Asahi Chemical; $^1$H-NMR analysis indicated 67 wt % polystyrene, 17 wt % polybutylene, 16 wt % polyethylene** |
| PP-g-MA | polypropylene with about 0.7 wt % poly(maleic anhydride) grafts, obtained in pellet form as EXXELOR ® PO1020 from ExxonMobil |
| glass fibers | Glass fibers, filament diameter = 14 micron, sized for PP matrix, average length = 4 mm; obtained from Owens Corning as 147A-14P |
| additives | a mixture of conventional thermal stabilizers |

*SBBS $^1$H-NMR analysis is consistent with the product of quantitative hydrogenation of pendant aliphatic unsaturation, and 50 mol % hydrogenation of in-chain aliphatic unsaturation, in a styrene-butadiene-styrene block copolymer containing 69 wt % polystyrene and 31 wt % polybutadiene, wherein 67 mol % of butadiene units were 1,4-addition products, and 33 mol % of butadiene units were 1,2- or 3,4-addition products.
**SEBS, H1043 $^1$H-NMR analysis is consistent with quantitative hydrogenation of pendant and in-chain aliphatic unsaturation in a styrene-butadiene-styrene block copolymer containing 67 wt % polystyrene and 33 wt % polybutadiene, wherein 48 mol % of butadiene units were 1,4-addition products, and 52 mol % of butadiene units were 1,2- or 3,4-addition products.

General Blending/Compounding Procedure: Using quantities specified in Table 2, PP-g-PS, PPE, xPS, HIPS, SBBS or SEBS, and SBS were hand mixed in a bag. Unless otherwise specified, all component quantities are expressed in parts by weight. The resulting mixture was subsequently mixed aggressively with a mechanical blender for uniformity. The uniform mixture was subsequently fed through a feeder and entered into an extruder at the extruder initial entry point. In the instance when the quantity of the polystyrene or rubber-modified polystyrene components were each equal to or greater than 10% of the total blend weight, the polystyrene or rubber-modified polystyrene components were fed thorough a separate upstream feeder. Components PP and EPR or EBR, in quantities specified in Table 2, were fed downstream, at approximately barrel 5 of a 10-barrel extruder. Glass fibers were fed downdownstream, at approximately barrel 6 of a 10-barrel extruder.

General Extrusion: a 30 millimeter co-rotating twin-screw extruder was used. Blends were melt extruded at 520° F., 450–500 rpm, and a throughput rate of 30–55 pounds per hour. Melt from the extruder was forced through a three-hole die to produce melt strands. These strands were rapidly cooled by passing them through a cold-water bath. The cooled strands were chopped into pellets. Pellets were dried in the oven at 200° F. for 2–4 hours.

General Molding: ASTM parts were molded on a 120 tonne molding machine (manufacturer Van Dorn) at 450–550° F. barrel temperature and 100–120° F. mold temperature.

Parts were tested according to ASTM methods. Izod notched impact was measured at 73° F. and −20° F. according to ASTM D256. Dynatup (falling dart) total energy and energy to failure were measured at 73° F. and −20° F. and at 5 and 7.5 mph according to ASTM D3763. Heat distortion temperature (HDT) was measured at 66 psi and 264 psi on ⅛ inch samples according to ASTM D648. Flexural modulus was measured at 73° F. on ⅛ inch samples according to ASTM D790. Tensile strength at yield, tensile strength at break, and tensile elongation at break were measured at 73° F. according to ASTM D638. Where presented, standard deviations reflect measurements on five samples.

The results are presented in Table 2. Compared to Comparative Examples 2, 4, 6, 8, and 10 containing the low-styrene hydrogenated block copolymer "SEBS, G1652", Examples 1–10 containing the selectively hydrogenated block copolymer "SBBS", generally exhibit superior values of flexural modulus, flexural strength, heat distortion temperature, energy to maximum load at 73° F., total energy at 73° F., tensile strength at yield, and tensile strength at break. Particularly in unfilled formulations, the SBBS-containing compositions exhibited reduced variability in energy to maximum load at 73° F. and total energy at 73° F. It should be noted that the selectively hydrogenated block copolymer provides the compositions with an excellent property balance at substantially lower cost than required by the high-styrene hydrogenated block copolymer "SEBS, H1043".

TABLE 2

|  | Ex. 1 | Ex. 2 | C. Ex. 1 | C. Ex. 2 |
|---|---|---|---|---|
| COMPOSITION |  |  |  |  |
| PP | 15.76 | 15.76 | 15.76 | 15.76 |
| PPE | 15.00 | 15.00 | 15.00 | 15.00 |
| xPS | 4.15 | 4.15 | 4.15 | 4.15 |
| SBS D1101 | 0.00 | 0.00 | 0.00 | 0.00 |
| HIPS | 0.00 | 0.00 | 0.00 | 0.00 |
| PP-g-PS | 0.00 | 0.00 | 0.00 | 0.00 |
| PP-g-MA | 2.00 | 2.00 | 2.00 | 2.00 |
| SBBS | 10.00 | 10.00 | 0.00 | 0.00 |
| SEBS H1043 | 0.00 | 0.00 | 10.00 | 0.00 |
| SEBS G1652 | 0.00 | 0.00 | 0.00 | 10.00 |
| PP-EPR | 21.75 | 21.75 | 21.75 | 21.75 |
| EBR | 0.00 | 0.00 | 0.00 | 0.00 |
| glass fibers | 31.34 | 31.34 | 31.34 | 31.34 |
| additives | 0.25 | 0.25 | 0.25 | 0.25 |
| PROPERTIES |  |  |  |  |
| Flexural Modulus, 73° F., ⅛" (psi) | 832,000 | 832,400 | 806,100 | 525,700 |
| Flexural Modulus, 73° F., ⅛", std dev (psi) | 10,520 | 15,170 | 17,780 | 3,707 |
| Flexural Strength at yield, 73° F., ⅛" (psi) | 19,500 | 19,610 | 19,350 | 15,240 |
| Flexural Strength at yield, 73° F., ⅛", std dev (psi) | 346 | 388 | 298 | 177 |
| HDT, 66 psi, ⅛" (° F.) | 314.2 | 314.4 | 314.1 | 307.6 |
| HDT, 66 psi, ⅛", std dev (° F.) | 0.3 | 0.86 | 0.56 | 1.6 |
| HDT, 264 psi, ⅛" (° F.) | 279.6 | 280.1 | 283.7 | 260.3 |
| HDT, 264 psi, ⅛", std dev (° F.) | 1.78 | 2.26 | 4.43 | 2.4 |
| Notched Izod, 73° F. (ft-lb/in) | 2.2 | 2.3 | 2.4 | 3.5 |
| Notched Izod, 73° F. std dev, (ft-lb/in) | 0.1 | 0.1 | <0.05 | 0.1 |
| Notched Izod, −20° F. (ft-lb/in) | 1.6 | 1.6 | 1.6 | 2.1 |
| Notched Izod, −20° F., std dev (ft-lb/in) | 0.1 | <0.05 | <0.05 | 0.2 |
| Unnotched Izod, 73° F. (ft-lb/in) | 13.5 | 13.1 | 13.9 | 16.9 |
| Unnotched Izod, 73° F., std dev (ft-lb/in) | 1.2 | 1.1 | 0.9 | 0.9 |
| Energy to Max Load, 73° F., 7.5 mph (ft-lb) | 5.03 | 3.52 | 3.47 | 3.02 |
| Energy to Max Load, 73° F., 7.5 mph, std dev (ft-lb) | 1.99 | 0.76 | 0.61 | 0.72 |
| Total Energy, 73° F., 7.5 mph (ft-lb) | 12.06 | 12.81 | 12.84 | 10.97 |
| Total Energy, 73° F., 7.5 mph, std dev (ft-lb) | 1.38 | 0.15 | 0.33 | 0.52 |
| Energy to Failure, −20° F., 7.5 mph (ft-lb) | 6.9 | 8.66 | 7.95 | 8.5 |
| Energy to Failure, −20° F., 7.5 mph, std dev (ft-lb) | 2.52 | 1.25 | 1.10 | 0.75 |
| Total Energy, −20° F., 7.5 mph (ft-lb) | 11.21 | 13.05 | 12.4 | 11.89 |
| Total Energy, −20° F., 7.5 mph, std dev (ft-lb) | 2.67 | 1.38 | 2.46 | 2.20 |
| Energy to Failure, −20° F., 5 mph (ft-lb) | — | — | — | — |
| Energy to Failure, −20° F., 5 mph, std dev (ft-lb) | — | — | — | — |
| Total Energy, −20° F., 5 mph (ft-lb) | — | — | — | — |
| Total Energy, −20° F., 5 mph, std dev (ft-/lb) | — | — | — | — |
| Tensile Strength at yield, 73° F. (psi) | 12,304 | 12,238 | 12,121 | 9,129 |
| Tensile Strength at yield, 73° F., std dev (psi) | 170 | 55 | 39 | 160 |
| Tensile Strength at break, 73° F. (psi) | 12,304 | 12,238 | 12,120 | 9,128 |
| Tensile Strength at break, 73° F., std dev (psi) | 170.1 | 54.8 | 39.2 | 161.5 |
| Tensile Elongation at break, 73° F. (%) | 6.75 | 6.74 | 6.89 | 10.49 |
| Tensile Elongation at break, 73° F., std dev (%) | 0.07 | 0.08 | 0.08 | 0.11 |

|  | Ex. 3 | Ex. 4 | C Ex. 3 | C Ex. 4 |
|---|---|---|---|---|
| COMPOSITION |  |  |  |  |
| PP | 16.35 | 16.35 | 16.35 | 16.35 |
| PPE | 20.84 | 20.84 | 20.84 | 20.84 |
| xPS | 7.00 | 7.00 | 7.00 | 7.00 |
| SBS D1101 | 0.00 | 0.00 | 0.00 | 0.00 |
| HIPS | 0.00 | 0.00 | 0.00 | 0.00 |
| PP-g-PS | 0.00 | 0.00 | 0.00 | 0.00 |
| PP-g-MA | 2.00 | 2.00 | 2.00 | 2.00 |

TABLE 2-continued

|  |  |  |  |  |
|---|---|---|---|---|
| SBBS |  | 5.00 | 5.00 | 0.00 | 0.00 |
| SEBS H1043 |  | 0.00 | 0.00 | 5.00 | 0.00 |
| SEBS G1652 |  | 0.00 | 0.00 | 0.00 | 5.00 |
| PP-EPR |  | 8.85 | 8.85 | 8.85 | 8.85 |
| EBR |  | 0.00 | 0.00 | 0.00 | 0.00 |
| glass fibers |  | 40.00 | 40.00 | 40.00 | 40.00 |
| additives |  | 0.25 | 0.25 | 0.25 | 0.25 |
| PROPERTIES |  |  |  |  |  |
| Flexural Modulus, 73° F., 1/8" (psi) | 1,177,000 | 1,216,000 | 1,199,000 | 837,800 |
| Flexural Modulus, 73° F., 1/8", std dev (psi) | 82,300 | 9,075 | 28,160 | 19,120 |
| Flexural Strength at yield, 73° F., 1/8" (psi) | 20,770 | 20,750 | 22,070 | 19,280 |
| Flexural Strength at yield, 73° F., 1/8", std dev (psi) | 450 | 393 | 336 | 299 |
| HDT, 66 psi, 1/8" (° F.) | 318.4 | 319.2 | 319.6 | 314.2 |
| HDT, 66 psi, 1/8", std dev (° F.) | 0.55 | 0.12 | 0.4 | 0.8 |
| HDT, 264 psi, 1/8" (° F.) | 294.3 | 299.7 | 297.5 | 278.6 |
| HDT, 264 psi, 1/8", std dev (° F.) | 4.99 | 1.79 | 0.88 | 1.3 |
| Notched Izod, 73° F. (ft-lb/in) | 1.7 | 1.5 | 1.7 | 2.3 |
| Notched Izod, 73° F., std dev (ft-lb/in) | 0.2 | 0.1 | <0.05 | 0.1 |
| Notched Izod, −20° F. (ft-lb/in) | 1.4 | 1.3 | 1.5 | 1.9 |
| Notched Izod, −20° F., std dev (ft-lb/in) | <0.05 | <0.05 | <0.05 | 0.4 |
| Unnotched Izod, 73° F. (ft-lb/in) | 9.4 | 9.6 | 11 | 13.2 |
| Unnotched Izod, 73° F., std dev (ft-lb/in) | 1.3 | 1.3 | 0.5 | 0.4 |
| Energy to Max Load, 73° F., 7.5 mph (ft-lb) | 7.34 | 7.59 | 7.25 | 3.00 |
| Energy to Max Load, 73° F., 7.5 mph, std dev (ft-lb) | 0.50 | 0.68 | 1.47 | 0.46 |
| Total Energy, 73° F., 7.5 mph (ft-lb) | 10.44 | 10.24 | 11.68 | 10.75 |
| Total Energy, 73° F., 7.5 mph, std dev (ft-lb) | 1.35 | 0.67 | 0.71 | 0.52 |
| Energy to Failure, −20° F., 7.5 mph (ft-lb) | 7.16 | 7.36 | 9.00 | 6.57 |
| Energy to Failure, −20° F., 7.5 mph, std dev (ft-lb) | 1.42 | 2.71 | 1.47 | 1.85 |
| Total Energy, −20° F., 7.5 mph (ft-lb) | 8.81 | 9.21 | 10.71 | 9.89 |
| Total Energy, −20° F., 7.5 mph, std dev (ft-lb) | 1.79 | 2.36 | 2.25 | 1.62 |
| Energy to Failure, −20° F., 5 mph (ft-lb) | — | — | — | — |
| Energy to Failure, −20° F., 5 mph, std dev (ft-lb) | — | — | — | — |
| Total Energy, −20° F., 5 mph (ft-lb) | — | — | — | — |
| Total Energy, −20° F., 5 mph, std dev (ft-lb) | — | — | — | — |
| Tensile Strength at yield, 73° F. (psi) | 14,212 | 14,189 | 14,363 | 11,872 |
| Tensile Strength at yield, 73° F., std dev (psi) | 210 | 340 | 220 | 74 |
| Tensile Strength at break, 73° F. (psi) | 14,212 | 14,189 | 14,363 | 11,872 |
| Tensile Strength at break, 73° F., std dev (psi) | 213.1 | 340.8 | 215.0 | 73.6 |
| Tensile Elongation at break, 73° F. (%) | 5.15 | 4.94 | 5.66 | 8.19 |
| Tensile Elongation at break, 73° F., std dev (%) | 0.32 | 0.19 | 0.24 | 0.40 |

|  | Ex. 5 | Ex. 6 | C. Ex. 5 | C. Ex. 6 |
|---|---|---|---|---|
| COMPOSITION |  |  |  |  |
| PP | 9.00 | 9.00 | 9.00 | 9.00 |
| PPE | 16.20 | 16.20 | 16.20 | 16.20 |
| xPS | 20.20 | 20.20 | 20.20 | 20.20 |
| SBS D1101 | 11.40 | 11.40 | 11.40 | 11.40 |
| HIPS | 0.00 | 0.00 | 0.00 | 0.00 |
| PP-g-PS | 5.90 | 5.90 | 5.90 | 5.90 |
| PP-g-MA | 0.00 | 0.00 | 0.00 | 0.00 |
| SBBS | 6.30 | 6.30 | 0.00 | 0.00 |
| SEBS H1043 | 0.00 | 0.00 | 6.30 | 0.00 |
| SEBS G1652 | 0.00 | 0.00 | 0.00 | 6.30 |
| PP-EPR | 31.10 | 31.10 | 31.10 | 31.10 |
| EBR | 0.00 | 0.00 | 0.00 | 0.00 |
| glass fibers | 0.00 | 0.00 | 0.00 | 0.00 |
| additives | 0.25 | 0.25 | 0.25 | 0.25 |
| PROPERTIES |  |  |  |  |
| Flexural Modulus, 73° F., 1/8" (psi) | 228,700 | 228,600 | 224,600 | 182,600 |
| Flexural Modulus, 73° F., 1/8", std dev (psi) | 2,349 | 530 | 4,796 | 1,515 |
| Flexural Strength at yield, 73° F., 1/8" (psi) | 7,211 | 7,255 | 7,131 | 6,146 |
| Flexural Strength at yield, 73° F., 1/8", std dev (psi) | 26 | 29 | 76 | 44 |
| HDT, 66 psi, 1/8" (° F.) | 232.9 | 227.3 | 227.5 | 225.7 |
| HDT, 66 psi, 1/8", std dev (° F.) | 8.14 | 1.43 | 3.67 | 5.5 |
| HDT, 264 psi, 1/8" (° F.) | 165.6 | 165.8 | 165.1 | 156.8 |
| HDT, 264 psi, 1/8", std dev (° F.) | 3.67 | 3.42 | 2.8 | 1.3 |
| Notched Izod, 73° F. (ft-lb/in) | 6.2 | 6.9 | 7.5 | 4.6 |
| Notched Izod, 73° F., std dev (ft-lb/in) | 0.2 | 0.1 | 0.2 | 0.3 |
| Notched Izod, −20° F. (ft-lb/in) | 2.0 | 1.9 | 2.1 | 2.2 |
| Notched Izod, −20° F., std dev (ft-lb/in) | 0.2 | <0.05 | 0.1 | 0.7 |
| Unnotched Izod, 73° F. (ft-lb/in) | — | — | — | — |
| Unnotched Izod, 73° F., std dev (ft-lb/in) | — | — | — | — |
| Energy to Max Load, 73° F., 7.5 mph (ft-lb) | 18.70 | 18.78 | 18.72 | 11.62 |
| Energy to Max Load, 73° F., 7.5 mph, std dev (ft-lb) | 0.50 | 1.11 | 0.31 | 5.99 |
| Total Energy, 73° F., 7.5 mph (ft-lb) | 27.25 | 27.65 | 29.58 | 13.94 |

TABLE 2-continued

| | | | | |
|---|---|---|---|---|
| Total Energy, 73° F., 7.5 mph, std dev (ft-lb) | 1.93 | 3.79 | 0.75 | 6.02 |
| Energy to Failure, −20° F., 7.5 mph (ft-lb) | 5.17 | 12.4 | 10 | 1.52 |
| Energy to Failure, −20° F., 7.5 mph, std dev (ft-lb) | 1.81 | 5.46 | 7.14 | 0.83 |
| Total Energy, −20° F., 7.5 mph (ft-lb) | 5.64 | 12.96 | 10.63 | 1.66 |
| Total Energy, −20° F., 7.5 mph, std dev (ft-lb) | 1.91 | 5.59 | 7.26 | 0.89 |
| Energy to Failure, −20° F., 5 mph (ft-lb) | 15.91 | 20.75 | 17.99 | 1.47 |
| Energy to Failure, −20° F., 5 mph, std dev (ft-lb) | 3.26 | 0.77 | 5.41 | 0.82 |
| Total Energy, −20° F., 5 mph (ft-lb) | 16.43 | 23.79 | 23.99 | 1.56 |
| Total Energy, −20° F., 5 mph, std dev (ft-lb) | 3.38 | 2.6 | 10.28 | 0.85 |
| Tensile Strength at yield, 73° F. (psi) | 4,906 | 4,938 | 4,880 | 4,146 |
| Tensile Strength at yield, 73° F., std dev (psi) | 10 | 30 | 30 | 60 |
| Tensile Strength at break, 73° F. (psi) | 4,141.4 | 4,231.8 | 4,315.8 | 3,618.8 |
| Tensile Strength at break, 73° F., std dev (psi) | 57.1 | 163.5 | 232.8 | 109.9 |
| Tensile Elongation at break, 73° F. (%) | 127.2 | 135.7 | 198.4 | 113.5 |
| Tensile Elongation at break, 73° F., std dev (%) | 11.98 | 47.77 | 36.97 | 22.91 |

| | Ex. 7 | Ex. 8 | C. Ex. 7 | C. Ex. 8 |
|---|---|---|---|---|
| COMPOSITION | | | | |
| PP | 24.30 | 24.30 | 24.30 | 24.30 |
| PPE | 27.56 | 27.56 | 27.56 | 27.56 |
| xPS | 14.10 | 14.10 | 14.10 | 14.10 |
| SBS D1101 | 5.00 | 5.00 | 5.00 | 5.00 |
| HIPS | 4.30 | 4.30 | 4.30 | 4.30 |
| PP-g-PS | 3.80 | 3.80 | 3.80 | 3.80 |
| PP-g-MA | 0.00 | 0.00 | 0.00 | 0.00 |
| SBBS | 8.00 | 8.00 | 0.00 | 0.00 |
| SEBS H1043 | 0.00 | 0.00 | 8.00 | 0.00 |
| SEBS G1652 | 0.00 | 0.00 | 0.00 | 8.00 |
| PP-EPR | 0.00 | 0.00 | 0.00 | 0.00 |
| ERR | 13.00 | 13.00 | 13.00 | 13.00 |
| glass fibers | 0.00 | 0.00 | 0.00 | 0.00 |
| additives | 0.25 | 0.25 | 0.25 | 0.25 |
| PROPERTIES | | | | |
| Flexural Modulus, 73° F., ⅛" (psi) | 211,300 | 210,900 | 190,500 | 137,300 |
| Flexural Modulus, 73° F., ⅛", std dev (psi) | 2,358 | 3,572 | 46 | 1,673 |
| Flexural Strength at yield, 73° F., ⅛" (psi) | 7,273 | 7,025 | 6,705 | 5,442 |
| Flexural Strength at yield, 73° F., ⅛", std dev (psi) | 52 | 15 | 36 | 45 |
| HDT, 66 psi, ⅛" (° F.) | 250.6 | 252.7 | 251.1 | 235.4 |
| HDT, 66 psi, ⅛", std dev (° F.) | 2.51 | 0.12 | 2.13 | 8.2 |
| HDT, 264 psi, ⅛" (° F.) | 178.2 | 179.6 | 175.5 | 155.4 |
| HDT, 264 psi, ⅛", std dev (° F.) | 1.98 | 1.66 | 7.16 | 2.1 |
| Notched Izod, 73° F. (ft-lb/in) | 8.5 | 8.8 | 9.7 | 5.7 |
| Notched Izod, 73° F., std dev (ft-lb/in) | 0.1 | 0.2 | 0.4 | 0.4 |
| Notched Izod, −20° F. (ft-lb/in) | 2.2 | 2.4 | 2.7 | 3.0 |
| Notched Izod, −20° F., std dev (ft-lb/in) | 0.2 | 0.2 | 0.3 | 0.4 |
| Unnotched Izod, 73° F. (ft-lb/in) | — | — | — | — |
| Unnotched Izod, 73° F., std dev (ft-lb/in) | — | — | — | — |
| Energy to Max Load, 73° F., 7.5 mph (ft-lb) | 19.61 | 19.31 | 19.54 | 19.1 |
| Energy to Max Load 73° F., 7.5 mph, std dev (ft-lb) | 0.30 | 0.59 | 0.61 | 1.4 |
| Total Energy, 73° F., 7.5 mph (ft-lb) | 26.51 | 27.83 | 28.98 | 25.32 |
| Total Energy, 73° F., 7.5 mph, std dev (ft-lb) | 1.9 | 1.06 | 0.22 | 3.36 |
| Energy to Failure, −20° F., 7.5 mph (ft-lb) | 22.94 | 23.16 | 23.32 | 11.82 |
| Energy to Failure, −20° F., 7.5 mph, std dev (ft-lb) | 3.33 | 1.32 | 0.99 | 5.92 |
| Total Energy, −20° F., 7.5 mph (ft-lb) | 28.19 | 29.87 | 30.67 | 12.28 |
| Total Energy, −20° F., 7.5 mph, std dev (ft-lb) | 6.02 | 4.59 | 3.39 | 6.06 |
| Energy to Failure, −20° F., 5 mph (ft-lb) | 21.05 | 21.41 | 15.91 | 14.94 |
| Energy to Failure, −20° F., 5 mph, std dev (ft-lb) | 0.44 | 0.3 | 7.1 | 4.24 |
| Total Energy, −20° F., 5 mph (ft-lb) | 27.44 | 29.3 | 22.46 | 15.51 |
| Total Energy, −20° F., 5 mph, std dev (ft-lb) | 5.42 | 2.12 | 12.69 | 4.5 |
| Tensile Strength at yield, 73° F. (psi) | 5,062 | 5,001 | 4,821 | 4,028 |
| Tensile Strength at yield, 73° F., std dev (psi) | 40 | 10 | 20 | 70 |
| Tensile Strength at break, 73° F. (psi) | 4,645.6 | 4,677.2 | 4,766 | 3,901.8 |
| Tensile Strength at break, 73° F., std dev (psi) | 51.4 | 26.7 | 65.5 | 99.3 |
| Tensile Elongation at break, 73° F. (%) | 98.7 | 95.7 | 137.7 | 114.3 |
| Tensile Elongation at break, 73° F., std dev (%) | 33.06 | 9.01 | 11.67 | 12.94 |

| | Ex. 9 | Ex. 10 | C. Ex. 9 | C. Ex. 10 |
|---|---|---|---|---|
| COMPOSITION | | | | |
| PP | 12.30 | 12.30 | 12.30 | 12.30 |
| PPE | 16.20 | 16.20 | 16.20 | 16.20 |
| xPS | 20.20 | 20.20 | 20.20 | 20.20 |
| SBS D1101 | 11.40 | 11.40 | 11.40 | 11.40 |
| HIPS | 0.00 | 0.00 | 0.00 | 0.00 |
| PP-g-PS | 0.00 | 0.00 | 0.00 | 0.00 |

TABLE 2-continued

| | | | | |
|---|---|---|---|---|
| PP-g-MA | 0.00 | 0.00 | 0.00 | 0.00 |
| SBBS | 6.30 | 6.30 | 0.00 | 0.00 |
| SEBS H1043 | 0.00 | 0.00 | 6.30 | 0.00 |
| SEBS G1652 | 0.00 | 0.00 | 0.00 | 6.30 |
| PP-EPR | 33.60 | 33.60 | 33.60 | 33.60 |
| EBR | 0.00 | 0.00 | 0.00 | 0.00 |
| glass fibers | 0.00 | 0.00 | 0.00 | 0.00 |
| additives | 0.20 | 0.20 | 0.20 | 0.20 |
| PROPERTIES | | | | |
| Flexural Modulus, 73° F., 1/8" (psi) | 207,500 | 204,000 | 199,500 | 167,600 |
| Flexural Modulus, 73° F., 1/8", std dev (psi) | 1,678 | 1,791 | 2,385 | 1,358 |
| Flexural Strength at yield, 73° F., 1/8" (psi) | 6,714 | 6,597 | 6,479 | 5,813 |
| Ftexural Strength at yield, 73° F., 1/8", std dev (psi) | 25 | 25 | 29 | 55 |
| HDT, 66 psi, 1/8" (° F.) | 229.7 | 224.3 | 229.2 | 223.6 |
| HDT, 66 psi, 1/8", std dev (° F.) | 9.46 | 1.94 | 0.97 | 2.6 |
| HDT, 264 psi, 1/8" (° F.) | 161.3 | 162 | 158.4 | 153.2 |
| HDT, 264 psi, 1/8", std dev (° F.) | 2.6 | 3.87 | 0.88 | 3.7 |
| Notched Izod, 73° F. (ft-lb/in) | 8.2 | 7.2 | 9.8 | 4.9 |
| Notched Izod, 73° F., std dev (ft-lb/in) | 0.4 | 0.1 | 1.0 | 0.3 |
| Notched Izod, −20° F. (ft-lb/in) | 2.2 | 2.1 | 1.9 | 2.0 |
| Notched Izod, −20° F., std dev (ft-lb/in) | 0.2 | 0.2 | 0.1 | 0.2 |
| Unnotched Izod, 73° F. (ft-lb/in) | — | — | — | — |
| Unnotched Izod, 73° F., std dev (ft-lb/in) | — | — | — | — |
| Energy to Max Load, 73° F., 7.5 mph (ft-lb) | 17.72 | 18.02 | 18.16 | 15.38 |
| Energy to Max Load, 73° F., 7.5 mph, std dev (ft-lb) | 0.28 | 0.40 | 0.19 | 1.94 |
| Total Energy, 73° F., 7.5 mph (ft-lb) | 28.43 | 26.59 | 29.83 | 18.2 |
| Total Energy, 73° F., 7.5 mph, std dev (ft-lb) | 1.57 | 1.66 | 1.17 | 3.53 |
| Energy to Failure, −20° F., 7.5 mph (ft-lb) | 19.84 | 14.97 | 15.51 | 3.71 |
| Energy to Failure, −20° F., 7.5 mph, std dev (ft-lb) | 6.14 | 4.92 | 5.43 | 2.83 |
| Total Energy, −20° F., 7.5 mph (ft-lb) | 29.25 | 15.62 | 16.87 | 3.94 |
| Total Energy, −20° F., 7.5 mph, std dev (ft-lb) | 11.15 | 5.04 | 6.77 | 2.91 |
| Energy to Failure, −20° F., 5 mph (ft-lb) | 21.63 | 15.27 | 20.99 | 1.86 |
| Energy to Failure, −20° F., 5 mph, std dev (ft-lb) | 0.42 | 5.71 | 1.58 | 0.78 |
| Total Energy, −20° F., 5 mph (ft-lb) | 31.57 | 18.05 | 27.31 | 1.98 |
| Total Energy, −20° F., 5 mph, std dev (ft-lb) | 1.46 | 9.65 | 3.91 | 0.8 |
| Tensile Strength at yield, 73° F. (psi) | 4,659 | 4,712 | 4,696 | 4,001 |
| Tensile Strength at yield, 73° F., std dev (psi) | 50 | 30 | 20 | 40 |
| Tensile Strength at break, 73° F. (psi) | 4,180.4 | 4,080.8 | 4,433.6 | 3,765.6 |
| Tensile Strength at break, 73° F., std dev (psi) | 78.7 | 56.7 | 232.8 | 63.7 |
| Tensile Elongation at break, 73° F. (%) | 164.8 | 131.2 | 267.3 | 194.1 |
| Tensile Elongation at break, 73° F., std dev (%) | 24.75 | 12.49 | 6.19 | 10.31 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A thermoplastic composition, comprising:
    a poly(arylene ether);
    a poly(alkenyl aromatic) resin in an amount of at least about 30 weight percent of the total of the poly(arylene ether) and the poly(alkenyl aromatic) resin;
    a polyolefin; and
    a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation.

2. The thermoplastic composition of claim 1, wherein poly(arylene ether) comprises a plurality of structural units of the formula:

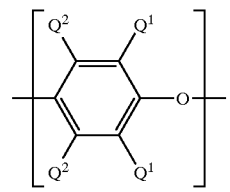

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_{1-8}$ aminoalkyl, $C_1$–$C_8$ hydrocarbonoxy, or $C_2$–$C_8$ halohydrocarbonoxy wherein at least two carbon atoms separate the halogen and oxygen atoms.

3. The thermoplastic composition of claim 2, wherein each $Q^1$ is independently $C_1$–$C_4$ alkyl or phenyl, and each $Q^2$ is hydrogen.

4. The thermoplastic composition of claim 1, wherein the poly(arylene ether) has an intrinsic viscosity of about 0.2 to about 0.6 dL/g as measured in chloroform at 25° C.

5. The thermoplastic composition of claim 1, wherein the poly(arylene ether) comprises a copolymer of 2,6-dimethylphenol and 2,3,6-trimethylphenol.

6. The thermoplastic composition of claim 1, comprising about 10 to about 59 weight percent poly(arylene ether), based on the total weight of the composition.

7. The thermoplastic composition of claim 1, wherein the poly(alkenyl aromatic) resin comprises at least 25% by weight of structural units derived from an alkenyl aromatic monomer of the formula:

$$R^1-C=CH_2$$

with a phenyl ring bearing $(Z)_p$ wherein $R^1$ is hydrogen, $C_1$–$C_8$ alkyl, or halogen; Z is vinyl, halogen, or $C_1$–$C_8$ alkyl; and p is 0 to 5.

8. The thermoplastic composition of claim 1, wherein the poly(alkenyl aromatic) resin comprises at least one poly(alkenyl aromatic) resin selected from the group consisting of atactic homopolystyrene, syndiotactic homopolystyrene, rubber-modified polystyrene, and mixtures comprising at least one of the foregoing poly(alkenyl aromatic) resins.

9. The thermoplastic composition of claim 1, comprising about 1 to about 46 weight percent poly(alkenyl aromatic) resin, based on the total weight of the composition.

10. The thermoplastic composition of claim 1, wherein the polyolefin comprises a homopolymer or copolymer having at least about 80 weight percent of units derived from polymerization of ethylene, propylene, butylene, or a mixture thereof.

11. The thermoplastic composition of claim 1, wherein the polyolefin is a propylene polymer comprising a homopolymer of polypropylene; or a random, graft, or block copolymer of propylene and at least one olefin selected from ethylene and $C_4$–$C_{10}$ alpha-olefins, with the proviso that the copolymer comprises at least about 80 weight percent of repeating units derived from propylene.

12. The thermoplastic composition of claim 1, wherein the polyolefin comprises a homopolypropylene.

13. The thermoplastic composition of claim 1, comprising about 10 to about 70 weight percent of the polyolefin, based on the total weight of the composition.

14. The thermoplastic composition of claim 1, wherein the selectively hydrogenated block copolymer comprises:

(A) at least one block derived from an alkenyl aromatic compound having the formula:

$$R^2C=CHR^3$$

with a benzene ring bearing $R^4$, $R^5$, $R^6$, $R^7$, $R^8$ wherein $R^2$ and $R^3$ each represent a hydrogen atom, a $C_1$–$C_6$ alkyl group, or a $C_2$–$C_6$ alkenyl group; $R^4$ and $R^8$ each represent a hydrogen atom, a $C_1$–$C_6$ alkyl group, a chlorine atom, or a bromine atom; and $R^5$–$R^7$ each independently represent a hydrogen atom, a $C_1$–$C_6$ alkyl group, or a $C_2$–$C_6$ alkenyl group, or $R^4$ and $R^5$ are taken together with the central aromatic ring to form a naphthyl group, or $R^5$ and $R^6$ are taken together with the central aromatic ring to form a naphthyl group including; and (B) at least one block derived from a conjugated diene, in which the aliphatic unsaturated group content in the block (B) is reduced by hydrogenation.

15. The thermoplastic composition of claim 1, wherein the selectively hydrogenated block copolymer comprises a styrene-(butadiene-butylene)-styrene triblock copolymer.

16. The thermoplastic composition of claim 1, wherein the selectively hydrogenated block copolymer has a styrene content of about 20 to about 90 weight percent.

17. The thermoplastic composition of claim 1, wherein the selectively hydrogenated block copolymer has up to about 10 percent residual pendant aliphatic unsaturation.

18. The thermoplastic composition of claim 1, wherein the selectively hydrogenated block copolymer has at least about 40 percent residual in-chain aliphatic unsaturation.

19. The thermoplastic composition of claim 1, wherein the selectively hydrogenated block copolymer has a ratio of percentage of unhydrogenated in-chain aliphatic unsaturation to percentage of unhydrogenated pendant aliphatic unsaturation of at least about 2.

20. The thermoplastic composition of claim 1, comprising about 1 to about 20 weight percent of the selectively hydrogenated block copolymer, based on the total weight of the composition.

21. The thermoplastic composition of claim 1, further comprising a polypropylene-polystyrene graft copolymer.

22. The thermoplastic composition of claim 21, wherein the polypropylene-polystyrene graft copolymer comprises a graft copolymer having a propylene polymer backbone and one or more styrene polymer grafts.

23. The thermoplastic composition of claim 22, wherein the polypropylene-polystyrene graft copolymer comprises about 10 to about 90 weight percent of the propylene polymer backbone and about 90 to about 10 weight percent of the styrene polymer grafts.

24. The thermoplastic composition of claim 21, comprising about 0.5 to about 15 weight percent of the polypropylene-polystyrene graft copolymer, based on the total weight of the composition.

25. The thermoplastic composition of claim 1, further comprising an unhydrogenated block copolymer of an alkenyl aromatic compound and a conjugated diene.

26. The thermoplastic composition of claim 25, wherein the unhydrogenated block copolymer comprises a styrene-butadiene diblock copolymer, a styrene-butadiene-styrene triblock copolymer, or a styrene-butadiene radial teleblock copolymer.

27. The thermoplastic composition of claim 25, comprising about 1 to about 20 weight percent of the unhydrogenated block copolymer.

28. The thermoplastic composition of claim 1, further comprising a fully hydrogenated block copolymer of an alkenyl aromatic compound and a conjugated diene, wherein the fully hydrogenated block copolymer has up to about 10 percent residual aliphatic unsaturation.

29. The thermoplastic composition of claim 28, wherein the fully hydrogenated block copolymer comprises a styrene-(ethylene-butylene)-styrene triblock copolymer.

30. The thermoplastic composition of claim 28, comprising about 1 to about 20 weight percent of the fully hydrogenated block copolymer.

31. The thermoplastic composition of claim 1, further comprising an ethylene/alpha-olefin elastomeric copolymer.

32. The thermoplastic composition of claim 31, wherein the ethylene/alpha-olefin elastomeric copolymer comprises a copolymer of ethylene and at least one $C_3$–$C_{10}$ alpha-olefin.

33. The thermoplastic composition of claim 31, wherein the ethylene/alpha-olefin elastomeric copolymer comprises an ethylene-butylene rubber, an ethylene-propylene rubber, or a mixture thereof.

34. The thermoplastic composition of claim 31, comprising about 1 to about 20 weight percent of the ethylene/alpha-olefin elastomeric copolymer.

35. The thermoplastic composition of claim 1, further comprising a reinforcing filler.

36. The thermoplastic composition of claim 35, wherein the reinforcing filler is selected from the group consisting of glass fibers, talc, quartz fibers, carbon fibers, potassium titanate fibers, silicon carbide fibers, boron carbide fibers, gypsum fibers, aluminum oxide fibers, iron fibers, nickel fibers, copper fibers, wollastonite fibers, poly(ether ketone) fibers, polyimide benzoxazole fibers, poly(phenylene sulfide) fibers, polyester fibers, aromatic polyamide fibers, aromatic polyimide fibers, aromatic polyetherimide fibers, acrylic fibers, poly(vinyl alcohol) fibers, polytetrafluoroethylene fibers, and combinations comprising at least one of the foregoing reinforcing fillers.

37. The thermoplastic composition of claim 35, wherein the reinforcing filler comprises glass fibers having a diameter of about 2 to about 25 micrometers.

38. The thermoplastic composition of claim 35, wherein the reinforcing filler comprises talc.

39. The thermoplastic composition of claim 35, wherein the reinforcing filler comprises vapor-grown carbon fibers having an average diameter of about 3.5 to about 500 nanometers.

40. The thermoplastic composition of claim 1, further comprising at least one additive selected from the group consisting of stabilizers, mold release agents, processing aids, flame retardants, drip retardants, nucleating agents, UV blockers, dyes, pigments, particulate fillers, conductive fillers, anti-static agents, blowing agents, and antioxidants.

41. The thermoplastic composition of claim 1, wherein the composition after molding has less than about 10% sample-to-sample variability in Izod Notched Impact Strength at 73° F. measured according to ASTM D256.

42. The thermoplastic composition of claim 1, wherein the composition after molding has less than about 10% sample-to-sample variability in Flexural Modulus at 73° F. measured according to ASTM D256.

43. A thermoplastic composition, comprising:
about 10 to about 59 weight percent of a poly(arylene ether);
about 3 to about 46 weight percent of a poly(alkenyl aromatic) resin, with the proviso that the poly(alkenyl aromatic) resin accounts for at least about 30 weight percent of the total of the poly(arylene ether) and the poly(alkenyl aromatic) resin;
about 10 to about 70 weight percent of a polyolefin; and
about 1 to about 20 weight percent of a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation;
wherein all weight percents are based on the total weight of the composition.

44. A thermoplastic composition, comprising the reaction product of:
a poly(arylene ether);
a poly(alkenyl aromatic) resin in an amount of at least about 30 weight percent of the total of the poly(arylene ether) and the poly(alkenyl aromatic) resin;
a polyolefin; and
a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation.

45. An article comprising the composition of claim 44.

46. An article comprising the composition of claim 44, wherein the article is formed using at least one method selected from the group consisting of injection molding, blow molding, extrusion, sheet extrusion, film extrusion, profile extrusion, pultrusion, compression molding, thermoforming, pressure forming, hydroforming, vacuum forming, and foam molding.

47. A method of preparing a thermoplastic composition, comprising:
melt-blending a poly(arylene ether); a poly(alkenyl aromatic) resin; a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and a polyolefin to form an intimate blend.

48. A method of preparing a thermoplastic composition, comprising:
melt-blending to form a first intimate blend comprising
a poly(arylene ether);
a poly(alkenyl aromatic) resin; and
a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation; and
melt-blending to form a second intimate blend comprising
the first intimate blend; and
a polyolefin.

* * * * *

UNITED STATES PATENT AND TRADEMARK OFFICE
CERTIFICATE OF CORRECTION

PATENT NO. : 6,872,777 B2
DATED : March 29, 2005
INVENTOR(S) : Adedeji et al.

It is certified that error appears in the above-identified patent and that said Letters Patent is hereby corrected as shown below:

Title page,
Item [73], Assignee, delete "Pittsfield MA" and insert therefor -- Schenectady, NY --.
Item [56], References Cited, OTHER PUBLICATIONS,
"G.–X. Wei," reference, after "May" delete "2-9" and insert therefor -- 2-6 --; and
delete (second instance of) "U.S. Appl. No. 09/682,929, filed Nov. 1, 2001, Adedeji et al.".

Column 1,
Line 20, before "and" delete "PPF" and insert therefor -- PPE, --.

Column 3,
Line 43, before "hydrocarbonoxy," delete "$C_1$-$C_1$" and insert therefor -- $C_1$-$C_8$ --.

Column 7,
Line 25, after "up" insert therefor -- to --.

Column 8,
Line 1, before "are" delete "structure" and insert therefor -- structures --.
Line 4, after "block)" delete "structure" and insert therefor -- structures --.
Line 4, after "linear" delete "structure" and insert therefor -- structures --.

Column 12,
Line 46, delete the paragraph "The composition may, optionally, further comprise a reinforcing filler. Reinforcing fillers any include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, vapor-grown carbon fibers, and especially graphitic vapor-grown carbon fibers having average diameters of about 3 to 500 nanometers (see, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent at al., and U.S. Pat. No. 5,591,382 to Nahass et al.); potassium titanate single-crystal fibers, silicon carbide fibers, boron carbide fibers, gypsum fibers, aluminum oxide fibers, asbestos, iron fibers, nickel fibers, copper fibers, wollastonite fibers; and the like. The reinforcing fillers may be in the form of glass roving cloth, glass cloth, hydrodgenated block copolymer may be the hydrogenation product of the unhydrogenated block copolymer described above. By fully hydrogenated, it is meant that up to about 20%, more preferably up to about 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%. The alkenyl aromatic content of the fully hydrogenated block copolymer may be about 10 weight percent to about 90 weight

UNITED STATES PATENT AND TRADEMARK OFFICE
CERTIFICATE OF CORRECTION

PATENT NO. : 6,872,777 B2
DATED : March 29, 2005
INVENTOR(S) : Adedeji et al.

It is certified that error appears in the above-identified patent and that said Letters Patent is hereby corrected as shown below:

Column 12 (cont'd),
percent, based on the total weight of the fully hydrogenated block copolymer. Within this range, it may be preferred to use a fully hydrogenated block copolymer having an alkenyl aromatic content of at least about 30 weight percent, more preferably at least about 55 weight percent. Also within this range, it may be preferred to use a fully hydrogenated block copolymer having an alkenyl aromatic content of up to about 80 weight percent, more preferably up to about 75 weight percent. For the fully hydrogenated block copolymer, the alkenyl aromatic compound and the conjugated diene compound are the same as those defined above for the selectively hydrogenated block copolymer. Fully hydrogenated block copolymers are commercially available as, for example, KRATON® G1650 and G1652 from Kraton Polymers, and TUFTEC® H1043 from Asahi Chemical. When present, the fully hydrogenated block copolymer may be used at about 1 weight percent to about 20 weight percent, based on the total weight of the composition.".

Column 17,
Line 62, after "31" (within Table 1), delete "weightt" and insert therefor -- weight --.
Line 63, after "pellet" delete "from" and insert therefor -- form --.

Signed and Sealed this

Sixth Day of September, 2005

JON W. DUDAS
*Director of the United States Patent and Trademark Office*